(12) United States Patent
Jeddeloh

(10) Patent No.: US 8,495,338 B2
(45) Date of Patent: Jul. 23, 2013

(54) TRANSACTION LOG RECOVERY

(75) Inventor: Joseph M. Jeddeloh, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 411 days.

(21) Appl. No.: 12/960,204

(22) Filed: Dec. 3, 2010

(65) Prior Publication Data

US 2012/0144152 A1 Jun. 7, 2012

(51) Int. Cl.
*G06F 12/00* (2006.01)

(52) U.S. Cl.
USPC ........................................................ 711/206

(58) Field of Classification Search
None
See application file for complete search history.

(56) References Cited

U.S. PATENT DOCUMENTS

| 6,185,663 | B1 | 2/2001 | Burke |
| 7,752,180 | B1 | 7/2010 | Fair et al. |
| 2009/0089339 | A1 | 4/2009 | Mitchell et al. |
| 2009/0150599 | A1 | 6/2009 | Bennett |
| 2009/0287874 | A1 | 11/2009 | Rogers et al. |
| 2009/0313453 | A1 | 12/2009 | Stefanus et al. |
| 2009/0327589 | A1 | 12/2009 | Moshayedi |
| 2010/0169710 | A1 | 7/2010 | Royer et al. |

OTHER PUBLICATIONS

International Search Report and Written Opinion for related PCT Application No. PCT/US2011/001944, mailed Jul. 31, 2012, (9 pages).

*Primary Examiner* — Duc Doan

(74) *Attorney, Agent, or Firm* — Brooks, Cameron & Huebsch, PLLC

(57) ABSTRACT

The present disclosure includes methods for transaction log recovery in memory. One such method includes examining a number of entries saved in a transaction log to determine a write pattern, reading the memory based on the write pattern, updating the transaction log with information associated with data read from the memory based on the write pattern, and updating a logical address (LA) table using the transaction log.

34 Claims, 7 Drawing Sheets

| | COMMAND 450 | PHYSICAL ADDRESS 452 | LOGICAL ADDRESS 454 | HOST WRITE 457 | RECLAMATION WRITE 458 |
|---|---|---|---|---|---|
| 456-1 | WRITE-1 | PA-1 | LA-1 | HW-1 | RW-1 |
| 456-2 | WRITE-2 | PA-2 | LA-2 | HW-2 | RW-2 |
| 456-3 | WRITE-3 | PA-3 | LA-3 | HW-3 | RW-3 |
| | ... | ... | ... | ... | ... |
| 456-N | WRITE-N | PA-N | LA-N | HW-N | RW-N |

| | PHYSICAL ADDRESS 552 | DATA VALIDITY 560 | ERASE COUNT 562 | STATUS INFORMATION 564 |
|---|---|---|---|---|
| 566-1 | PA-1 | DV-1 | EC-1 | SI-1 |
| 566-2 | PA-2 | DV-2 | EC-2 | SI-2 |
| 566-3 | PA-3 | DV-3 | EC-3 | SI-3 |
| | ⋮ | ⋮ | ⋮ | ⋮ |
| 566-M | PA-M | DV-M | EC-M | SI-M |

*Fig. 5*

| | PHYSICAL ADDRESS 652 | LOGICAL ADDRESS 654 |
|---|---|---|
| 670-1 | PA-1 | LA-1 |
| 670-2 | PA-2 | LA-2 |
| 670-3 | PA-3 | LA-3 |
| | ⋮ | ⋮ |
| 670-R | PA-R | LA-R |

TRANSACTION LOG RECOVERY

TECHNICAL FIELD

The present disclosure relates generally to semiconductor memory devices, methods, and systems, and more particularly, to transaction log recovery.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored information when not powered and can include NAND flash memory, NOR flash memory, read only memory (ROM), Electrically Erasable Programmable ROM (EEPROM), Erasable Programmable ROM (EPROM), and phase change random access memory (PCRAM), among others.

Memory devices can be combined together to form a solid state drive (SSD). A solid state drive can include non-volatile memory, e.g., NAND flash memory and NOR flash memory, and/or can include volatile memory, e.g., DRAM and SRAM, among various other types of non-volatile and volatile memory. Flash memory devices, including floating gate flash devices and charge trap flash (CTF) devices using semiconductor-oxide-nitride-oxide-semiconductor and metal-oxide-nitride-oxide-semiconductor capacitor structures that store information in charge traps in the nitride layer, may be utilized as non-volatile memory for a wide range of electronic applications. Flash memory devices typically use a one-transistor memory cell that allows for high memory densities, high reliability, and low power consumption.

An SSD can be used to replace hard disk drives as the main storage device for a computer, as the solid state drive can have advantages over hard drives in terms of performance, size, weight, ruggedness, operating temperature range, and power consumption. For example, SSDs can have superior performance when compared to magnetic disk drives due to their lack of moving parts, which may avoid seek time, latency, and other electro-mechanical delays associated with magnetic disk drives. SSD manufacturers can use non-volatile flash memory to create flash SSDs that may not use an internal battery supply, thus allowing the drive to be more versatile and compact.

An SSD can include a number of memory devices, e.g., a number of memory chips (as used herein, "a number of" something can refer to one or more of such things, e.g., a number of memory devices can refer to one or more memory devices). As one of ordinary skill in the art will appreciate, a memory chip can include a number of dies and/or logical units (LUNs). Each die can include a number of memory arrays and peripheral circuitry thereon. The memory arrays can include a number of memory cells organized into a number of physical pages, and the physical pages can be organized into a number of blocks.

SSDs can include a logical address (LA) table, such as a logical block address (LBA) table. An LBA table can be used to record the information that links the logical address of data to the physical location of the data in the memory arrays of an SSD. The LBA table can be stored in volatile memory in the solid state drive and a copy of the LBA table can also be stored in non-volatile memory in the solid state drive. The LBA table can be used to locate the physical location of data in the solid state drive to read the data when a read request is initiated in the solid state drive. A read request for data at a specific logical address can be initiated by a host. The logical address can be found in the LBA table and a corresponding physical address can then be indicated. The solid state drive can read the data from the indicated physical address to complete the read request for the solid state drive.

A solid state drive that does not have an LBA table with the current, e.g., most recent, information about relationships between the logical address and the physical address for the data in the solid state drive can make some data in the solid state drive inaccessible. Therefore, an LBA table that is current is desirable for complete access to all of the data in the solid state drive. An LBA table in the solid state drive can be lost or incomplete after a power interrupt due the LBA table being stored in volatile memory and/or the LBA table being periodically stored in non-volatile memory. Therefore, a power interrupt can cause a solid state drive to have an LBA table that does not have information about data that was written to the solid state drive in a time just prior to the power interrupt.

BRIEF DESCRIPTION OF THE DRAWINGS

FIG. 4 is a table that illustrates transaction log in accordance with one or more embodiments of the present disclosure.

FIG. 5 is a table that illustrates a block table in accordance with one or more embodiments of the present disclosure.

FIG. 6 is a table that illustrates a logical block address (LBA) table in accordance with one or more embodiments of the present disclosure.

DETAILED DESCRIPTION

Figure 1:
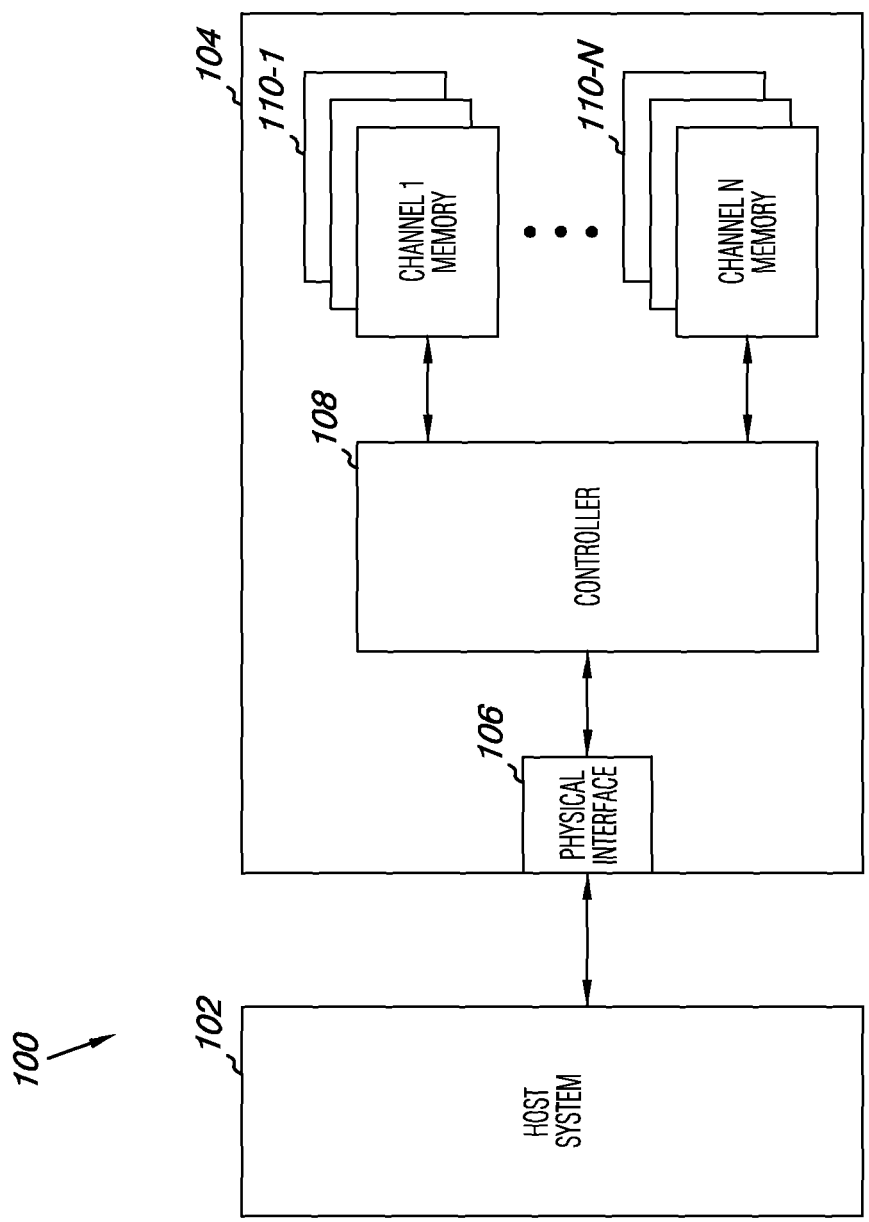
FIG. 1 is a functional block diagram of a computing system including at least one memory system, in accordance with one or more embodiments of the present disclosure.

The present disclosure includes methods for transaction log recovery in memory. One such method includes examining a number of entries saved in a transaction log to determine a write pattern, reading the memory based on the write pattern, updating the transaction log with information associated with data read from the memory based on the write pattern, and updating a logical address (LA) table using the transaction log.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice embodiments of this disclosure, and it is to be understood that other embodiments may be utilized and that process, electrical, and/or structural changes may be made without departing from the scope of the present disclosure.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designators "N", "M", and "R", particularly with respect to reference numerals in the drawings, indicates that a number of the particular feature so designated can be included with one or more embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 208 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a functional block diagram of a computing system 100 including at least one memory system 104, in accordance with one or more embodiments of the present disclosure. In the embodiment illustrated in FIG. 1, the memory system 104, e.g., a solid state drive (SSD), can include a physical host interface 106, a controller 108, e.g., memory system control circuitry, and one or more solid state memory devices 110-1, ..., 110-N. The solid state memory devices 110-1, ..., 110-N can provide a storage volume for the memory system, e.g., with a file system formatted to the memory devices. In one or more embodiments, the controller 108 can be an application specific integrated circuit (ASIC) coupled to a printed circuit board including the physical interface 106 and solid state memory devices 110-1, ..., 110-N.

As illustrated in FIG. 1, the controller 108 can be coupled to the physical host interface 106 and to the solid state memory devices 110-1, ..., 110-N. The physical host interface 106 can be used to communicate information between the memory system 104 and another device such as a host system 102. Host system 102 can include a memory access device, e.g., a processor. One of ordinary skill in the art will appreciate that "a processor" can intend one or more processors, such as a parallel processing system, a number of coprocessors, etc. Examples of host systems include laptop computers, personal computers, digital cameras, digital recording and playback devices, mobile telephones, PDAs, memory card readers, interface hubs, and the like. For one or more embodiments, the physical host interface 106 can be in the form of a standardized interface. For example, when the memory system 104 is used for data storage in a computing system 100, the physical host interface 106 can be a serial advanced technology attachment (SATA), peripheral component interconnect express (PCIe), or a universal serial bus (USB), among other connectors and interfaces. In general, however, physical host interface 106 can provide an interface for passing control, address, data, and other signals between the memory system 104 and a host system 102 having compatible receptors for the physical host interface 106.

The controller 108 can communicate with the solid state memory devices 110-1, ..., 110-N to read, write, and erase data, among other operations. Controller 108 can have circuitry that may be one or more integrated circuits and/or discrete components. For one or more embodiments, the circuitry in controller 108 may include control circuitry for controlling access across the solid state memory devices 110-1, ..., 110-N and circuitry for providing a translation layer between a host system 102 and the memory system 104. Thus, a memory controller could selectively couple an I/O connection (not shown in FIG. 1) of a solid state memory device 110-1, ..., 110-N to receive the appropriate signal at the appropriate I/O connection at the appropriate time. Similarly, the communication protocol between a host system 102 and the memory system 104 may be different than what is required for access of a solid state memory device 110-1, ..., 110-N. Controller 108 could then translate the commands received from a host into the appropriate commands to achieve the desired access to a solid state memory device 110-1, ..., 110-N.

A solid state memory device 110-1, ..., 110-N can include one or more arrays of memory cells, e.g., non-volatile memory cells. The arrays can be flash arrays with a NAND architecture, for example. In a NAND architecture, the control gates of memory cells of a "row" can be coupled with an access, e.g., word, line, while the memory cells can be coupled in series source to drain in a "string" between a select gate source transistor and a select gate drain transistor. The string can be connected to a data, e.g., bit, line by the select gate drain transistor. The use of the terms "row" and "string" implies neither a linear nor an orthogonal arrangement of memory cells. As will be appreciated by those of ordinary skill in the art, the manner of connection of the memory cells to the bit lines and source lines depends on whether the array is a NAND architecture, a NOR architecture, or some other memory array architecture.

The solid state memory devices 110-1, ..., 110-N can include a number of memory cells that can be grouped. As used herein, a group can include one or more memory cells, such as a page, block, plane, die, an entire array, or other groups of memory cells. For example, some memory arrays can include a number of pages of memory cells that make up a block of memory cells. A number of blocks can be included in a plane of memory cells. A number of planes of memory cells can be included one a die. As an example, a 128 GB memory device can include 4314 bytes of data per page, 128 pages per block, 2048 blocks per plane, and 16 planes per device.

The solid state memory devices 110-1, ..., 110-N can include in a number of channels, wherein each channel can include a number of dies. Each channel can be organized using logical unit numbers (LUNs). When writing data to the solid state memory devices 110-1, ..., 110-N, data can be striped across the number of channels and LUNs. Data can be written to the solid state memory devices 110-1, ..., 110-N using a write pattern algorithm which stripes the data in a predictive pattern among the memory cells associated with the channels. Writing data can be limited by the ability of a channel to handle data traffic sent to a channel by the host, therefore a number of channels can be used by a memory system to allow more data to be written and read on the number of channels.

In a memory device, a physical page can refer to a unit of writing and/or reading, e.g., a number of cells that are written and/or read together or as a functional group of memory cells.

An even page and an odd page can be written and/or read with separate writing and/or reading operations. For embodiments including multilevel cells (MLC), a physical page can be logically divided into an upper page and a lower page of data. For example, one memory cell can contribute one or more bits to an upper page of data and one or more bits to a lower page of data. Accordingly, an upper page and a lower page of data can be written and/or read as part of one writing and/or reading operation, as the logical upper page and logical lower page are both part of the same physical page.

The memory system 104 can implement wear leveling to control the wear rate on the solid state memory devices 110-1, ..., 110-N. A solid state memory array can experience failure after a number of program and/or erase cycles. Wear leveling can reduce the number of program and/or erase cycles performed on a particular group. Wear leveling can include dynamic wear leveling to minimize the amount of valid blocks moved to reclaim a block. Dynamic wear leveling can include a technique called garbage collection in which blocks with more than a threshold amount of invalid pages are reclaimed by erasing the block. An invalid page, for example, can be a page of data that has been updated and stored in a different page. Static wear leveling can include writing static data to blocks that have high erase counts to prolong the life of the block.

The embodiment of FIG. 1 can include additional circuitry that is not illustrated so as not to obscure embodiments of the present disclosure. For example, the memory system 104 can include address circuitry to latch address signals provided over I/O connections through I/O circuitry. Address signals can be received and decoded by a row decoder and a column decoder to access the solid state memory devices 110-1, ..., 110-N. It will be appreciated by those skilled in the art that the number of address input connections can depend on the density and architecture of the solid state memory devices 110-1, ..., 110-N.

Figure 2:
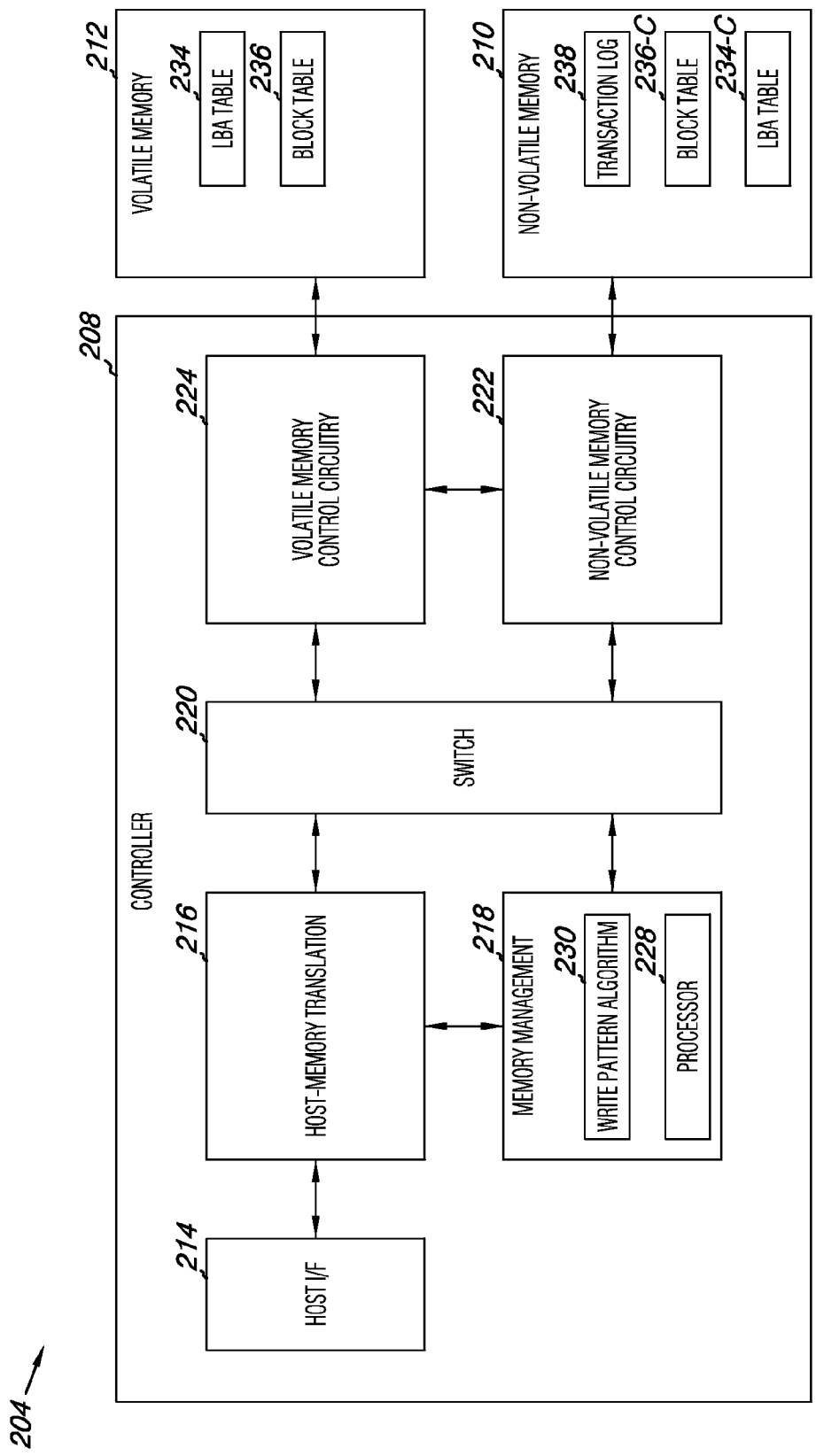
FIG. 2 is a functional block diagram of a memory system in accordance with one or more embodiments of the present disclosure.

FIG. 2 is a functional block diagram of a memory system 204 in accordance with one or more embodiments of the present disclosure. The memory system 204 can include controller 208. The controller 208 can be coupled to one or more solid state memory devices, e.g., non-volatile memory 210 and/or volatile memory 212. Memory system 204 and controller 208 can be analogous to memory system 104 and controller 108 respectively, illustrated in FIG. 1.

The controller 208 can include host interface circuitry 214, host-memory translation circuitry 216, memory management circuitry 218, a switch 220, non-volatile memory control circuitry 222, and/or volatile memory control circuitry 224. As described herein, the controller 208 can be provided in the form of an ASIC, however, embodiments are not so limited.

The host interface circuitry 214 can be coupled to host-memory translation circuitry 216. The host interface circuitry 214 can be coupled to and/or incorporated with a physical interface to a host system, such as physical interface 106 illustrated in FIG. 1.

In general, the host interface circuitry 214 is responsible for converting command packets received from the host system, e.g., from a PCIe bus, into command instructions for the host-memory translation circuitry 216 and for converting memory responses into host system commands for transmission to the requesting host. For example, the host interface circuitry 214 can construct SATA command packets from PCIe based transaction layer packets.

The host-memory translation circuitry 216 can be coupled to the host interface circuitry 214, to the memory management circuitry 218, and/or to the switch 220. The host-memory translation circuitry 216 can be configured to translate logical (e.g., host) addresses (e.g., associated with a received command) to physical memory addresses. For example, the host-memory translation circuitry 216 can convert host sector read and write commands to commands directed for specific portions of the non-volatile memory 210. Each host operation can be translated into single or multi-sector non-volatile memory 210 operation.

The memory management circuitry 218 can be coupled to the host-memory translation circuitry 216 and/or to the switch 220. The memory management circuitry 218 can control a number of processes including but not limited to writing, reading, initialization, wear leveling (e.g., garbage collection and/or block reclamation) and, error correction, e.g., via operation of processor 228. In a transaction log recovery process, memory management circuitry 218 can use the write pattern created by the write pattern algorithm 230 to determine where data was written and where to write data next. The write pattern algorithm can cause the controller 208 to write data to memory cells located on a number of channels in a predictive pattern. A write pattern for host writes can be established according the write pattern algorithm 230 and a write pattern for reclamation writes can be established according to the write pattern algorithm 230. In some embodiments, the write pattern can include memory cells written in a predictive pattern. A write pattern can include writing data across channels by filling a block on each channel from the lowest address to the highest address. For example, the controller can write data to a page on a first channel, then to a page on a second channel, then to a page on a third channel, and then back to another page on the first channel according to the write pattern algorithm to create the write pattern. When writing data, data can be written, using the write pattern algorithm, one page at a time to a block on a channel until the block is full, and then data will be written starting on a new block on the channel when data is to be written on the channel again according to the write pattern algorithm. The memory management circuitry 218 can update an LBA table, e.g., LBA table 234, with a new physical address corresponding to a logical address when data associated with the logical address is written to the new physical address (e.g., as part of wear leveling or an update to the data).

Memory management circuitry 218 can access a table, e.g., block table 236, to determine candidates for wear leveling. The memory management circuitry 218 can, e.g., as part of a static wear leveling operation, search for blocks that have a high erase count in block table 236. The memory management circuitry can compare the erase count of a particular block with a threshold count. For example, the erase count of the block with the lowest erase count can be subtracted from the particular block. If the difference is greater than the threshold count, then the particular block can be indicated as a candidate for block reclamation.

The memory management circuitry 218 can, e.g., as part of a dynamic wear leveling operation, search for blocks that have a garbage collection threshold amount of invalid, e.g., unused, portions, e.g., pages, therein. Reclamation is a process that can be invoked by memory management circuitry 218 as a result of garbage collection and/or wear leveling. Reclamation can involve moving all valid data from location in a block to be erased to locations in another block before the block is erased.

The switch 220 can be coupled to the host-memory translation circuitry 216, the memory management circuitry 218, the non-volatile control circuitry 222, and/or the volatile memory control circuitry 224. The switch 220 can be a crossbar switch and can include and/or be coupled to one or more buffers, e.g., static random access memory (SRAM) buffers.

The switch 220 can provide an interface between various components of the controller 208. The switch 220 can account for variations in defined signaling protocols that may be associated with different components of the controller 208 in order to provide consistent access and implementation between components. In one or more embodiments, the switch 220 can be a direct memory access (DMA) module.

The controller, e.g., non-volatile memory control circuitry 222, can be coupled to the switch 220 and to one or more non-volatile memory devices 210. Among other information, the one or more non-volatile memory devices 210 can store a transaction log 238, a copy of a logical address (LA) table, such as logical block address (LBA) table 234-C, and/or a group table, such as block table 236-C, as described herein. In some embodiments, the controller 208 can include one non-volatile memory controller for all memory channels. In other embodiments, each memory channel is coupled to a discrete non-volatile memory controller.

The volatile memory control circuitry 224 can be coupled to the switch 220 and to one or more volatile memory devices 212. Among other information, the one or more volatile memory devices can store an LBA table 234 and/or a block table 236. The LBA table 234 can store the physical address of pages in the one or more non-volatile memory devices 210 and include corresponding logical addresses. The LBA table 234 can be indexed by the LBA that is contained in an associated SATA command. The LBA table 234 can be used by the host-memory translation circuitry 216, for example, to look-up physical page addresses that correspond to logical block addresses. The block table 236 can store information for erasable blocks in the one or more non-volatile memory devices 210. Information stored in the block table 236 can include valid page information, erase count, and other status information. Information accessed from the block table 236 can be indexed by physical block address.

Figure 3:
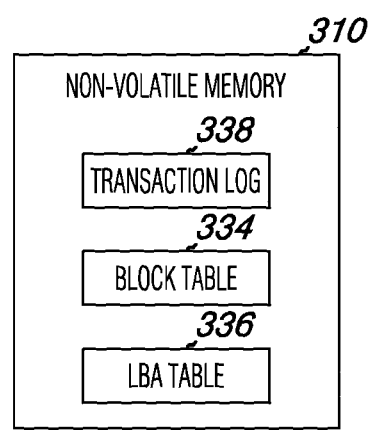
FIG. 3 illustrates a block diagram of a transaction log, block table, and logical block address (LBA) table in non-volatile memory in accordance with one or more embodiments of the present disclosure.

FIG. 3 illustrates a block diagram of a transaction log 338, block table 334, and logical block address (LBA) table 336 in non-volatile memory 310 in accordance with one or more embodiments of the present disclosure. Among other information, the non-volatile 310 memory can store write operation information, which can include the logical address, the physical address, the data type, the erase count for the location, status information, among other information, in an LBA table 336, a block table 334, and/or a transaction log 338.

A copy of an LBA table stored in volatile memory can be periodically stored as a LBA table 336 in the non-volatile memory 310, such as at least every 300 seconds, among other periodic intervals. For example, the LBA table 336 can be stored in the non-volatile memory 310 every 120 seconds. The LBA table in volatile memory can be updated after each write in the solid state drive. The time period for the frequency of updating the LBA table in non-volatile memory devices can be dependent on the frequency of the writes that the memory system performs and/or the speed at which data is written, among other factors.

A transaction log 338 can be stored in the non-volatile memory and used to record information about writes that occur in the memory devices. A memory system having a number of memory devices can include a transaction log that includes information about writes that occur in the memory devices. A transaction log can include information about host writes and/or reclamation writes. Information about host writes and/or reclamation writes are included in the transaction log as the writes occur in the memory. The transaction log can be striped across a number of memory devices in a memory system. As one of ordinary skill in the art will appreciate, striping includes splitting data so that it is stored on more that one device. Striping can include dividing write data, such as the transaction log information, into fragments and storing at least one fragment in each of a number of memory devices. In one or more embodiments, the controller can update the transaction log with transaction log information for each write as each write is executed in the memory devices. The transaction log can contain transaction log information for all writes that occur in the memory devices during a time period. The transaction log can include transaction log information for all writes to the memory devices that occurred since the last time that the LBA table 336 was saved in the non-volatile memory 310.

In one or more embodiments, information from the transaction log 338 can be used to update the copy of the LBA table 336 with information about writes that occurred in the memory device(s) from the time after the LBA table 336 was last saved in the non-volatile memory, e.g., between the last save and a power interrupt. The copy of the LBA table 336 in non-volatile memory 310 may otherwise be missing information because the LBA copy 336 in non-volatile memory 310 only has the information that was in the LBA table in volatile memory at the time it was copied into non-volatile memory. Also, the LBA tale in volatile memory is erased during a power interrupt, so the LBA copy in non-volatile memory cannot otherwise be updated with the information that would have been stored in the LBA table in volatile memory between the last time it was copied to non-volatile memory 310 and when it was erased. Therefore, the transaction log 338 in non-volatile memory 310 can be used to update the information in the LBA table in non-volatile memory. The transaction log 338 can contain information about the location of data and time that the data was written to the memory devices. A page of data in the transaction log 338 can include information associated with 128 write operations, for example. The information can be confirmed by the memory devices and then input into the LBA table to update the LBA table 336. In one or more embodiments, the last page of the transaction log can become corrupt during the power interrupt, so the last page of information in the transaction log does not contain information about some of the most recent data that was written to the memory arrays.

In some instances, a transaction log recovery process can include examining a number of entries in the saved transaction log to determine the write pattern and determine the location in memory of the last saved write in the transaction log. The write pattern along with information from the last saved write can be used to determine the next location in memory of the next write in the write pattern, e.g., the first write in the write pattern without associated information saved in the transaction log. Pages in memory can be read in an order based on the write pattern. The next data page that should have had information associated with the data page in the transaction log according to the write pattern is read and if there is data written to the data page, the metadata associated with that data page is used to update the transaction log with information associated with this data page, such as the LBA of the data page, for example. Then the next data page that should have been in the transaction log according to the write pattern is read and if there is data written to the data page, the transaction log is again updated with information associated with this page. This process is used to update the transaction log until an erased page is found, which indicates where the last write occurred due to a power interruption. In one or more embodiments, the updated transaction log can be used to update the LBA table.

In one or more embodiments, when the transaction log recovery process reaches a block that is full, e.g., at a block boundary, while reading pages to determine if data has been written to the page, the write pattern may not indicate the block in which the next write occurred. The transaction log recovery process can search for a partially written block. A block that is partially written is a block that was being written to in accordance with the write pattern algorithm when the power interruption occurred because blocks on a given channel are written one at a time according to the write pattern algorithm until the block is full.

A partially written block can be located by reading the first and last pages of a number of blocks and determining the type of data included in the partially written block when the pages read in the memory in the order based on the write pattern are in a block that does not include erased pages. If the first page contains data and the last page is erased, the block is partially written and this partially written block is identified as the block where data was being written when the power interruption occurred. Once a partially written block is located, a determination as to whether it is written with host data or with reclamation data can be made using the host write identifier and/or the reclamation write identifier in the transaction log. Reclamation data is data that is written as part of a wear leveling and/or garbage collection process. A partially written block with reclamation data can be ignored during the transaction log recovery process because the reclamation data in the partially written block has not been erased from its original location if the block is partially written because data is not erased during wear leveling and/or garbage collection until a write confirmation for the reclamation data is received. Therefore, the reclamation data in a partially written block does not have to be saved in the transaction log. Once a partially written block with host data is located, the pages are read to determine if they contain data and, if they do, the transaction log is updated with information associated with the pages that contain data, wherein the information associated with the page can be a logical address contained in the Metadata. The transaction log recovery process can continue until an erased page is found, which indicates the location where the write pattern ended due to a power interruption.

In one or more embodiments, the transaction log recovery process can use the write pattern to recreate the corrupt last page of information in the transaction log. The LBA table in non-volatile memory can then be updated with the now complete transaction log. A transaction log that is updated with the location of data before a power interrupt can be used to update the LBA table to include information about writes between the last save of the LBA table in non-volatile memory and the time of a power interrupt.

FIG. 4 is a table that illustrates transaction log 438 in accordance with one or more embodiments of the present disclosure. In FIG. 4, the transaction log 438 can include transaction log information that includes the physical address 452 and the logical address 454 for the data that is in the memory devices. The transaction log 438 can record the location of every write that occurs in the memory devices and the transaction log 438 can be stored in the memory devices. The transaction log can be striped across a number of memory devices in a memory system. In one or more embodiments, a transaction log can log each transaction, including each host write and each reclamation write, that occurs in the memory devices and can be a reference for the memory devices and/or controller of the transactions performed on the memory devices. The transaction log can be erased after a copy of the LBA table from volatile memory is made in non-volatile memory. The transaction log can be updated with new entries corresponding to transactions that occur after erasing the transaction log.

In FIG. 4, transaction log 438 can include a number of entries 456-1, 456-2, 456-3, ..., 456-N that indicate each transaction that has occurred in the memory devices. The entries 456-1, 456-2, 456-3, ..., and 456-N in the transaction log 438 can include the command 450 for the transaction, such as a write, a read, or an erase, the physical address 452 of the transaction, the logical address 454 of the transaction, host write identifier 457, and a reclamation write identifier 458. The host write identifier 457 can indicate that the transaction was originated by a host, e.g., the data type is host data, and the reclamation write identifier 458 can indicate that the transaction was originated as part of a reclamation process, e.g., the data type is reclamation data.

FIG. 5 is a table that illustrates a block table 534 in accordance with one or more embodiments of the present disclosure. The block table 534 can store information about the blocks in the memory devices. The information stored in block table 534 can include data validity information 560, erase count 562, and status information 564. The block table 534 can include a number of entries 566-1, 566-2, 566-3, ..., and 566-M. Each entry in the block table 534 can include the physical address 552, data validity information 560, erase count 562, and status information 564 for data, such as a block and/or page of data. The data validity information 560 in block table 534 can include information about the validity of each page in a block, e.g., whether the data is valid or invalid. The erase count 562 in block table 534 can indicate the number of times a block has been erased. The status information 564 in block table 534 can indicate whether a block is erased and/or contains data, among other status indicators for a block.

FIG. 6 is a table that illustrates a logical block address (LBA) table 636 in accordance with one or more embodiments of the present disclosure. The LBA table 636 can store the logical address 654 and physical address 652 for each data entry in the memory devices and can provide the translation for the logical address 654 to physical address 652 for each data entry in the memory devices. The LBA table 636 can be indexed by the LBA for each write to the memory devices and can include a number of entries 670-1, 670-2, 670-3, ..., and 670-R that include the logical address 654 and the physical address 652 for each data entry in the LBA table 636. The LBA can be used to look-up the corresponding physical address where the data in each entry is stored. The LBA table can be stored in volatile memory of a memory system and a copy of the LBA table in volatile memory can be made in non-volatile memory on a periodic basis. Once a copy of the LBA table is made in non-volatile memory, the LBA table in volatile memory can be erased and LBA table in volatile memory will be updated with new entries corresponding to transactions that occur after erasing the LBA table in volatile memory.

Figure 7:
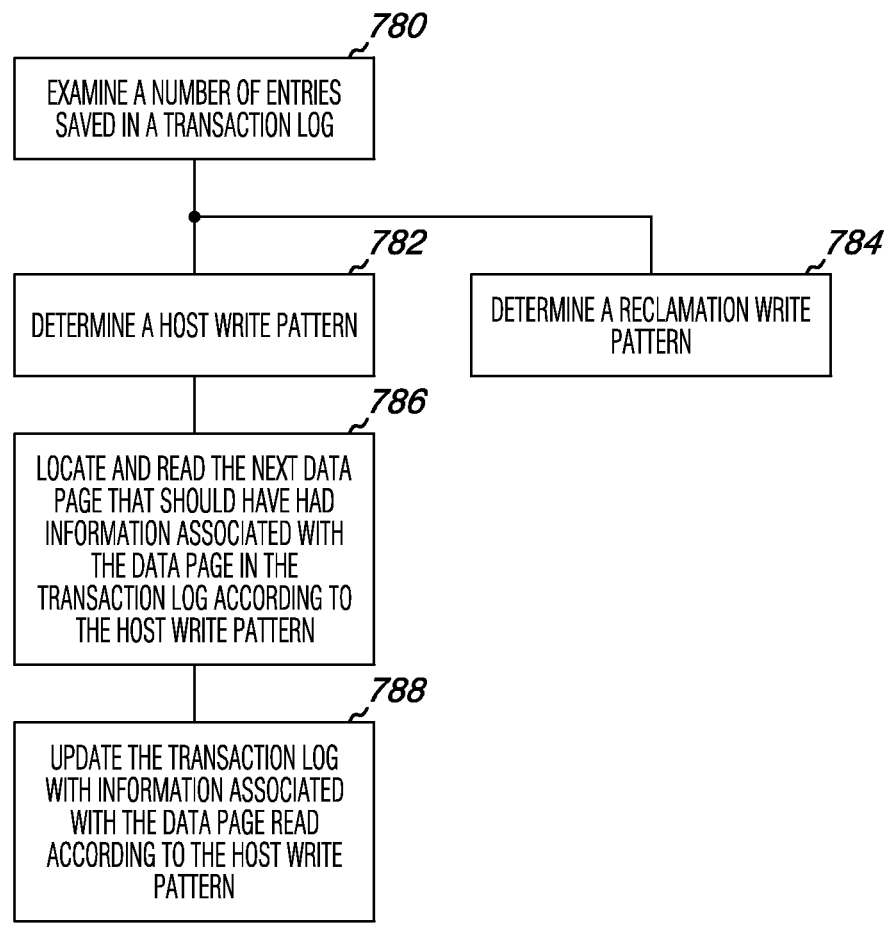
FIG. 7 is a method flow diagram that illustrates transaction log recovery in accordance with one or more embodiments of the present disclosure.

FIG. 7 is a method flow diagram that illustrates transaction log recovery in accordance with one or more embodiments of the present disclosure. In one or more embodiments, transaction log recovery can include examining a number of entries saved in a transaction log 780. The examination of the entries in the transaction log can be used to determine a host write pattern 782 and to determine a reclamation write pattern 784. The host write pattern can be used to locate and read the next data page that should have had information associated with the data page in the transaction log according to the host write pattern 786. The transaction log recovery can include updating the transaction log with information associated with the data page read according to the host write pattern 788.

The present disclosure includes methods for transaction log recovery in memory. One such method includes examining a number of entries saved in a transaction log to determine a write pattern, reading the memory based on the write pattern, updating the transaction log with information associated with data read from the memory based on the write pattern, and updating a logical address (LA) table using the transaction log.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for transaction log recovery, comprising:
    examining a number of entries saved in a transaction log to determine a write pattern;
    reading the memory based on the write pattern;
    updating the transaction log with information associated with data read from the memory based on the write pattern; and
    updating a logical address (LA) table using the transaction log.

2. The method of claim 1, wherein reading the memory based on the write pattern includes reading pages in memory.

3. The method of claim 2, wherein the transaction log did not have information associated with the pages read prior to being updated.

4. The method of claim 2, wherein updating the transaction log comprises updating the transaction log with information associated with pages read in memory that include data.

5. The method of claim 2, further including locating a partially written block by reading the first and last pages of a number of blocks and determining the type of data included in the partially written block when the pages read in the memory in the order based on the write pattern are in a block that does not include erased pages.

6. The method of claim 5, further including reading pages of the partially written block that includes host data.

7. The method of claim 6, further including updating the transaction log with information associated with pages read in the partially written block that contains data.

8. The method of claim 1, wherein the transaction log includes information about the location where data had most recently been written in the memory.

9. The method of claim 1, wherein reading the memory comprises reading pages in the memory in the order based on the write pattern until an erased page is found.

10. A method for operating a memory system, comprising:
    reading pages in the memory system that do not have associated data in a transaction log in an order based on a write pattern;
    updating a transaction log with information associated with the pages read based on the write pattern; and
    updating a logical address (LA) table in non-volatile memory using the updated transaction log.

11. The method of claim 10, further comprising, prior to a power interrupt, storing the LA table in the non-volatile memory on a periodic basis, the stored LA table being a copy of a LA table in volatile memory.

12. The method of claim 11, wherein the LA table in the volatile memory is updated after each write operation in the memory system.

13. The method of claim 11, wherein, prior to updating the LA table, the LA table in non-volatile memory does not include information about write operations that occurred between a last time the LA table was stored in non-volatile memory and a power interruption.

14. The method of claim 10, further comprising copying the updated LA table to volatile memory upon power up of the memory system after a power interruption.

15. The method of claim 10, wherein the write pattern is based on a write pattern algorithm that determines where to write data in the memory system.

16. The method of claim 15, wherein the write pattern includes information about the location where data would have been written next in the memory system.

17. The method of claim 16, wherein the method includes verifying a valid write occurred at the page read based on the write pattern.

18. A method for transaction log recovery in a memory system, comprising:
    reading pages in an order based on a write pattern to find write operation information that was not in a transaction log or a logical address (LA) table in non-volatile memory;
    updating the transaction log using the found write operation information;
    updating the LA table in non-volatile memory using the updated transaction log; and
    storing the LA table in volatile memory.

19. The method of claim 18, wherein finding information about the write operation includes determining the location where data would have been written next in the memory system from the write pattern.

20. The method of claim 19, wherein determining the location where the data would have been written next comprises using a write pattern algorithm.

21. The method of claim 18, wherein updating the transaction log comprises updating a last page of the transaction log that became corrupt after the power interrupt.

22. The method of claim 18, wherein the method includes storing a copy of the LA table in the volatile memory on a periodic basis.

23. The method of claim 18, wherein the method includes recording information about read and write operations in the transaction log for operations that occur after storing a copy of the LA table in the non-volatile memory.

24. The method of claim 18, wherein updating the LA table in the non-volatile memory using the updated transaction log comprises adding information about a write that occurred between a last time the LA table was copied into the non-volatile memory and a power interrupt.

25. A memory system, comprising:
non-volatile memory configured to store a logical address (LA) table and a transaction log; and
a controller configured to:
  determine a write pattern by examining information in a transaction log that indicates where data was written in memory;
  read pages in the memory in an order based on the write pattern;
  update the transaction log with information associated with the pages read in memory; and
  update the logical address (LA) table using the transaction log.

26. The memory system of claim 25, wherein the transaction log is configured to record information about writes occurring in the memory system after storing the LA table in non-volatile memory.

27. The memory system of claim 25, wherein the controller is configured to recreate the last page of transaction log information in a transaction log by reading pages in memory in the order based on the write pattern.

28. The memory system of claim 25, wherein the controller is configured to create the write pattern based on a write pattern algorithm.

29. A memory system, comprising:
non-volatile memory, wherein the non-volatile memory is configured to store a logical address (LA) table and a transaction log; and
a controller configured to:
  update the transaction log by reading pages in an order based a write pattern, and
  update the LA table with information missing from the LA table after a power interruption using the updated transaction log.

30. The memory system of claim 29, wherein the controller is further configured to store a copy of the updated LA table in volatile memory.

31. The memory system of claim 30, wherein the controller is configured to continually update the updated LA table in the volatile memory and store a copy of the continually updated LA table in the non-volatile memory at least once every 300 seconds.

32. The memory system of claim 29, wherein the controller is configured to determine the write pattern using the transaction log.

33. The memory system of claim 32, wherein the controller is configured to determine where data would have been written next in the memory system using the write pattern.

34. The memory system of claim 29, wherein the LA table is a logical block address (LBA) table.

* * * * *

UNITED STATES PATENT AND TRADEMARK OFFICE
CERTIFICATE OF CORRECTION

PATENT NO. : 8,495,338 B2
APPLICATION NO. : 12/960204
DATED : July 23, 2013
INVENTOR(S) : Joseph M. Jeddeloh It is certified that error appears in the above-identified patent and that said Letters Patent is hereby corrected as shown below:

In the Claims:

In column 29, line 7, in Claim 29, after "based" insert -- on --.

Signed and Sealed this
Twenty-ninth Day of October, 2013

Teresa Stanek Rea
*Deputy Director of the United States Patent and Trademark Office*